United States Patent Office 3,449,978
Patented June 17, 1969

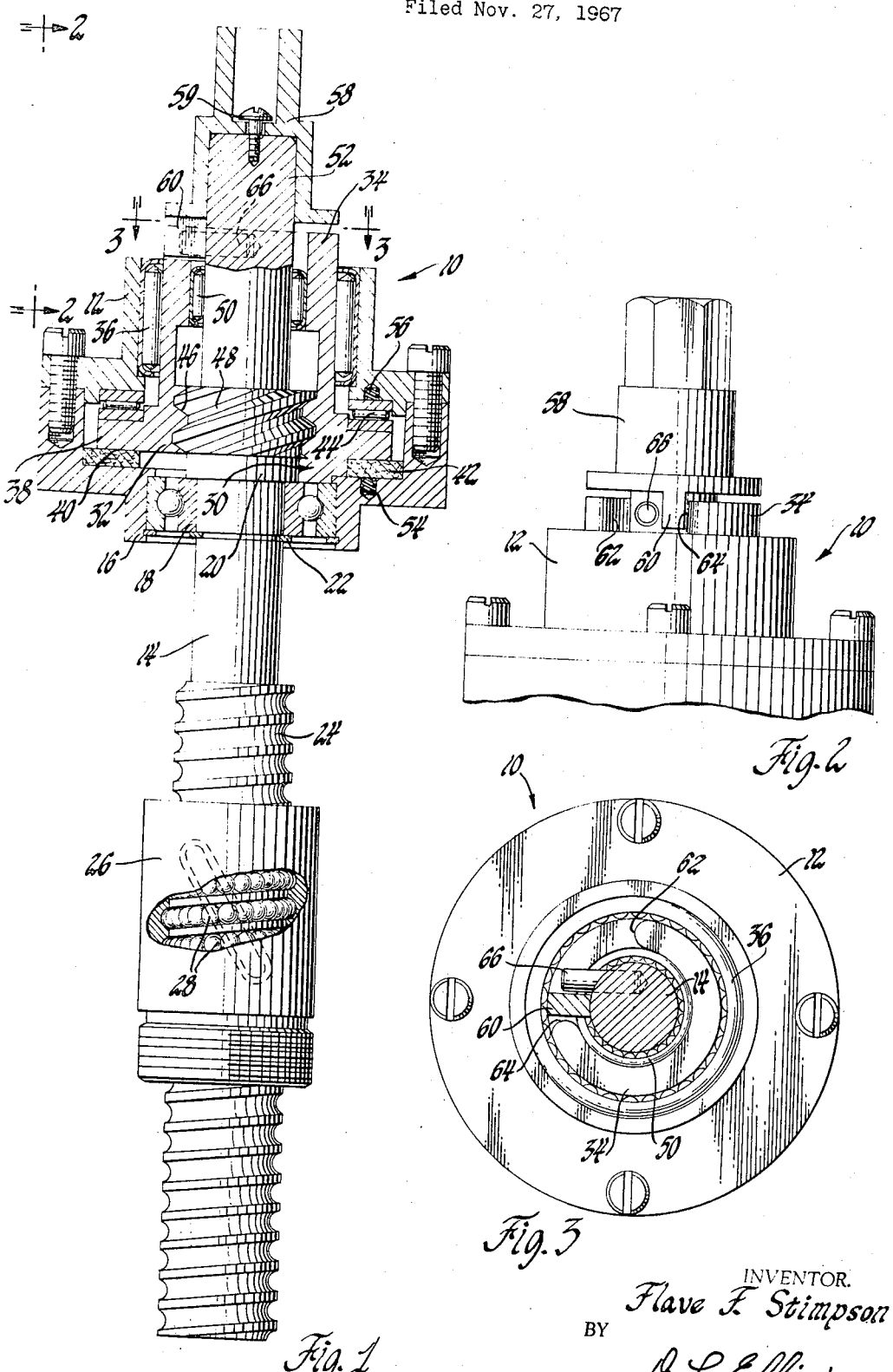

3,449,978
IRREVERSIBLE MECHANICAL MOVEMENT DEVICE
Flave F. Stimpson, Saginaw, Mich., assignor to General Motors Corporation, Detroit, Mich., a corporation of Delaware
Filed Nov. 27, 1967, Ser. No. 685,796
Int. Cl. F16h 57/00
U.S. Cl. 74—411.5                                   3 Claims

ABSTRACT OF THE DISCLOSURE

An irreversible ball screw actuator assembly includes an output shaft having one portion formed as an output ball bearing screw having engaged thereon a recirculating train of bearing balls and output ball nut, another portion of the output shaft being formed with acme or like threads providing a brake screw engaging a braking nut disposed adjacent a stationary housing carrying a friction brake member. Backdriving of the output shaft by a load on the output nut drives the brake screw for engagement of the braking nut with a friction brake member to hold the brake nut stationary and thus hold the output shaft stationary through the brake threads. A rotary input to the output shaft in either rotary direction is provided by a coupling operable in one direction of input to initially rotate the brake nut on the brake screw for disengagement from the braking member whereupon the brake nut couples to the output shaft for driving rotation of the latter, rotary input in the opposite direction causing direct drive on the output shaft and brake screw relative to the brake nut to again disengage the latter from the braking member.

---

One feature of this invention is that it provides a new and improved irreversible high efficiency mechanical movement device of the screw and nut type including a braking agency responsive to backdriving on the high efficiency screw by the output loading thereon to hold the output screw against such backdriving. Another feature of this invention is that the braking agency includes a brake screw rotatable by the output screw and engaged with a braking nut cooperable with a friction brake on a fixed support. A further feature of this invention resides in an input coupling arrangement for selectively driving the output screw in either rotative direction and operable to initially drive the braking nut for release of braking engagement thereof by a simple and economical arrangement of juxtaposed coupling abutments on the brake nut, the output screw and a rotary input element of the device.

These and other features and advantages of the invention will be readily apparent from the following specification and drawings wherein:

FIGURE 1 is an elevational view, partly in section, of the mechanical movement device of this invention;

FIGURE 2 is a view taken generally along the plane indicated by line 2—2 of FIGURE 1; and FIGURE 3 is a sectional view taken generally along the plane indicated by line 3—3 of FIGURE 1.

Referring now particularly to FIGURE 1 of the drawings, the mechanical movement device of this invention is shown illustratively embodied in a recirculating ball screw actuator of the type responsive to a rotary input on the ball screw to effect translation of an output ball nut connected to the load to be actuated. The ball screw actuator, designated generally as 10, includes a support housing 12 adapted for suitable mounting to the environmental apparatus or machine of interest. An output shaft 14 is rotatably mounted on a lower hub 16 of housing 12 by an antifriction ball bearing 18 seated between an annular shoulder of the hub 16 and a snap ring therein. The shaft 14 is axially held on the bearing 18 by an enlarged diameter portion 20 seating on the bearing at one side and a snap ring 22 seated in a groove of the shaft at the other side. Output shaft 14 includes a ball bearing screw portion 24 having a helical ball groove engaged with an output ball nut 26, which has like internal grooving, by a recirculating train of balls 28 all in a manner well understood in the art. Ball nut 26 is suitably connected to the output load of the environmental apparatus or machine whereby to effect translation thereof with the ball nut in either direction by rotation of output shaft 14 in the corresponding direction. For purposes of illustration, the ball screw portion 24 is shown with a righthand groove, the opposite or left-hand groove being equally well adapted for use as will appear hereinafter.

Mounted coaxially of output shaft 14 within the housing 12 is a brake nut 30 including an annularly flanged lower portion 32 and an upper hub portion 34 supported in the housing by a needle roller bearing assembly 36. The annular flange 38 of the lower portion 32 includes a braking face 40 juxtaposed to a friction braking member 42 seated on a radial planar surface of housing 12, while the upper or opposite face of the flange 38 bears on a needle roller bearing assembly 44. Lower portion 32 of the brake nut is provided with an internal helical thread 46 of acme or like type engaged with a complementary external brake screw thread 48 formed on output shaft 14. A needle roller bearing 50 is located between the upper end 52 of output shaft 14 and the upper hub portion 34 of the brake nut 30.

The braking member 42 will be understood to be constructed of any suitable friction brake material and of an annular or ring like configuration extending about the inner circumference of the housing 12 or it may optionally be comprised of a number of circumferentially spaced pads. In either case, an array of small coil compression springs 54 seat between the housing 12 and the braking member or members 42 to urge the latter upwardly toward the braking face 40, while similar coil springs 56 act between housing 12 and roller bearing 44 to urge the bearing and brake nut 30 downwardly of the housing. Braking member 42 may partake of frictional engagement with its seating surface of housing 12 to be nonrotatable thereto, or it may alternatively be suitably nonrotatably attached thereto.

In the embodiment shown, the output load of the environmental apparatus or machine against which the output nut 26 operates shall be understood for present illustrative purposes as exerting itself in a downward direction, thereby tending to translate the nut 26 downwardly and to rotate the right-hand screw 24 accordingly. Brake screw threads 46 and 48 being also of right-hand, this torque loading on the axially fixed output shaft 14 causes brake thread 48 to force brake nut 30 downwardly causing it to frictionally engage the rotatively fixed braking member 42 on housing 12 thereby to hold the brake nut stationary relative to the housing. The axially fixed output shaft 14 is accordingly held rotatively stationary to render it irreversible under the output loading on ball nut 26.

Referring to FIGURES 2 and 3, a coupling arrangement for providing rotative input to output shaft 14 in either direction and for releasing brake nut 30 from the friction braking member 42 comprises a rotary input sleeve 58 rotatably mounted on the upper portion 52 of the shaft 14 and held by a screw 59, the sleeve including an annular flange provided with a downwardly extending radial tang 60. Tang 60 is received within a slot in the upper extremity of upper hub portion 34 of the brake nut 30 defining a pair of abutment walls 62 and 64, tang 60 being seen as lying proximate the abutment wall 64. Also received in the slot of the brake nut is a radially extending pin 66 mounted in output shaft 14, the pin in turn lying proximate tang 60 and spaced somewhat from the abutment wall 62. Assuming that it is desired to provide a rotary input to output shaft 14 in one direction causing upward translation of ball nut 26, the required rotation of input sleeve 58, seen as clockwise in FIGURE 3, causes tang 60 to pick up pin 66 establishing direct connection between the input sleeve and the output shaft 14. During the initial such unitary rotation of the parts occurring in the angular space of the brake nut slot between pin 66 and abutment wall 62, the brake thread 48 on output shaft 14 causes the frictionally held brake nut 30 to be translated upwardly from firm frictional engagement with the braking member 42. With completion of this disengagement, the pin 66 picks up abutment wall 62 whereby the input sleeve 58, the output shaft 14 and the brake nut 30 then rotate as a unit free of substantial resistance from braking member 42 whereby to drive the ball nut 26 in an upward direction against its load. Slight frictional contact between braking member 42 and brake nut 30 may obtain in the disengaged position of the latter, but with proper sizing of the parts and correct selection of the strength of springs 54 and 56, this will be insufficient to alter the operation of the device.

An opposite rotary input on input sleeve 58, seen as counterclockwise in FIGURE 3, causes tang 60 to pick up abutment wall 64 to connect the input sleeve and brake nut 30 for initial unitary rotation relative to output shaft 14 over the angle obtaining between abutment wall 62 and pin 66. Brake nut 30 is accordingly rotated on the brake thread 48 of the stationary output shaft 14 to translate upwardly and disengage from braking member 42. Upon completion of such disengagement, abutment wall 62 of the brake nut engages pin 66 for unitary rotation of output shaft 14 with the brake nut and the input sleeve substantially free of braking resistance from braking member 42 to drive the ball nut 26 in a downward direction.

Various alternative embodiments of the irreversible mechanical movement device of this invention are of course available for different environmental applications. For example, should the loading or reaction on output nut 26 be in an upward direction tending to backdrive output shaft counterclockwise, FIGURE 3, the brake threads 46 and 48 will be made of an opposite or left-hand for the required driving of brake nut 30 downwardly to engagement with braking member 42. In this case, the positions of tang 60 and pin 66 in respective juxtaposition to the two abutment walls 62 and 64 should be reversed for the required initial disengagement of the brake nut under rotary input on sleeve 58 in either direction.

If it is desired to use a left-hand thread or ball groove in screw 24 and ball nut 26, with the output loading being downward as in the described illustrative embodiment, then the brake threads 46 and 48 should also be made left-hand and the tangs 60 and pin 66 reversed as above.

It is seen that a change to a left-hand thread in screw 24 and ball nut 26 and a reversal of the output loading or reaction on ball nut 26 to act upwardly thereon, would require no change in the illustrative embodiment.

Having thus described the invention, what is claimed is:

1. An irreversible drive mechanical movement device, comprising, output shaft means including an output screw and a brake screw rotatable as a unit, an output nut engaged on said output screw by high efficiency helical thread means operable for translation of said output nut upon rotation of said output screw, a brake nut engaged on said brake screw by helical brake thread means operable for translation of said brake nut upon rotation relative thereto of said brake and output screws, a support adjacent said brake nut, braking means on said brake nut and said support engageable upon translation of said brake nut under backdriving rotation of said output shaft means by loading on said output nut whereby to hold said brake nut and said output shaft means through said brake thread means rotatably stationary relative to said support, a rotary input member adapted for connection with said output shaft means for unitary rotation therewith in opposite directions, and connecting means on said input member, said output shaft means and said brake nut operable in one direction of rotation of said input member to initially connect said input member and said brake nut for unitary rotation and for translation of said brake nut relative to said brake screw to disengage said braking means whereupon said connecting means connects said input member and said output shaft means for unitary rotation in said one direction, said connecting means under rotation of said input member in the opposite direction effecting direct connection of said input member and said output shaft means for unitary rotation relative to said brake nut and translation of the latter by said brake screw to disengage said braking means.

2. An irreversible drive mechanical movement device, comprising, a support housing, an output shaft rotatably mounted in said housing and including an output screw portion provided with a helical ball groove, an internally helically grooved output nut engaged on said output screw by a recirculating train of bearing balls operable for translation of said output nut upon rotation of said output shaft, said output shaft further including a brake screw portion, a brake nut engaged on said brake screw by helical brake thread means operable for translation of said brake nut upon rotation relative thereto of said output shaft, said housing including a braking portion adjacent said brake nut, friction braking means on said brake nut and said housing braking portion engageable upon translation of said brake nut under backdriving rotation of said output shaft by loading on said output nut whereby to hold said brake nut and said output shaft through said helical brake thread means rotatably stationary relative to said housing, a rotary input member adapted for connection with said output shaft for unitary rotation therewith in opposite directions, and connecting means on said input member, said output shaft and said brake nut operable in one direction of rotation of said input member to initially connect said input member and said brake nut for unitary rotation and for translation of said brake nut relative to said output shaft to disengage said braking means whereupon said connecting means connects said input member and said output shaft for unitary rotation in said one direction, said connecting means under rotation of said input member in the opposite direction effecting direct connection of said input member and said output shaft for unitary rotation relative to said brake nut and translation of the latter by said brake screw to disengage said braking means.

3. An irreversible drive mechanical movement device, comprising: a support housing; an output shaft rotatably mounted in said housing and including an output screw portion provided with a helical ball groove and a brake screw portion; an internally helically grooved output nut engaged on said output screw by a recirculating train of bearing balls operable for translation of said output nut upon rotation of said output screw; a brake nut engaged on said brake screw by helical brake thread means operable for translation of said brake nut upon rotation relative thereto of said output shaft; said housing including a braking flange adjacent a juxtaposed braking flange on said braking nut; a friction braking member on one of said flanges and engageable with the other of said flanges upon translation of said brake nut under backdriving rotation of said output shaft by loading on said output nut whereby to hold said brake nut and said output shaft through said brake thread means rotatably stationary relative to said housing; a rotary input member arranged coaxially of said output shaft; and a coupling on said input member, said brake nut, and said output shaft including first coupling abutments on said input member and said brake nut engageable upon rotation of said input member in one direction to connect said input member and said brake nut for limited unitary rotation in said one direction independently of said output shaft for translation of said brake nut on said brake screw to disengage said braking member, second coupling abutments on said brake nut and said output shaft engageable following such limited independent rotation and disengagement of said braking member to positively connect said brake nut and said output shaft for unitary rotation with said input member in said one direction, and third coupling abutments operable upon rotation of said input member in the opposite direction to directly connect said input member and said output shaft for unitary rotation relative to said brake nut in said opposite direction effecting translation of said brake nut on said brake screw to disengage said braking member.

References Cited

UNITED STATES PATENTS

| | | | |
|---|---|---|---|
| 2,623,403 | 12/1952 | Terdina. | |
| 2,653,691 | 9/1953 | Weiland | 192—8 |
| 3,304,794 | 2/1967 | Bird | 74—424.8 X |
| 3,355,959 | 12/1967 | Whicker | 74—424.8 |
| 3,401,777 | 9/1968 | Williams | 192—8 |

LEONARD H. GERIN, *Primary Examiner.*

U.S. Cl. X.R.

74—89.15, 424.8; 188—134; 192—8